(12) United States Patent
Takahashi et al.

(10) Patent No.: US 8,599,993 B2
(45) Date of Patent: Dec. 3, 2013

(54) FUEL COMPACT

(75) Inventors: Masashi Takahashi, Ibaraki (JP); Kazutoshi Okubo, Ibaraki (JP)

(73) Assignee: Nuclear Fuel Industries, Ltd., Tokyo (JP)

( * ) Notice: Subject to any disclaimer, the term of this patent is extended or adjusted under 35 U.S.C. 154(b) by 627 days.

(21) Appl. No.: 11/581,537

(22) Filed: Oct. 16, 2006

(65) Prior Publication Data

US 2007/0086557 A1    Apr. 19, 2007

(30) Foreign Application Priority Data

Oct. 18, 2005  (JP) .................................. 2005-302533

(51) Int. Cl.
    *G21C 3/00*    (2006.01)
(52) U.S. Cl.
    USPC ............................. 376/414; 376/409; 376/412
(58) Field of Classification Search
    None
    See application file for complete search history.

(56) References Cited

U.S. PATENT DOCUMENTS

| | | | | |
|---|---|---|---|---|
| 3,135,665 A | * | 6/1964 | Koutz et al. | 376/423 |
| 3,801,451 A | * | 4/1974 | Scharf | 376/426 |
| 4,175,002 A | * | 11/1979 | Wada | 376/409 |
| 4,282,064 A | * | 8/1981 | Hayashi et al. | 376/426 |
| 4,814,137 A | * | 3/1989 | Beuchel et al. | 376/429 |
| 4,822,559 A | * | 4/1989 | Mogard | 376/415 |
| 5,024,559 A | * | 6/1991 | Beuchel | 425/406 |

FOREIGN PATENT DOCUMENTS

| | | |
|---|---|---|
| JP | 54-076795 A | 6/1979 |
| JP | 11-142565 A | 5/1999 |
| JP | 11-287883 A | 10/1999 |
| JP | 2000-284084 A | 10/2000 |
| JP | 2001-272496 A | 10/2001 |
| JP | 2006-064442 A | 3/2006 |
| JP | 4689573 B2 | 2/2011 |

OTHER PUBLICATIONS

Japanese Office Action dated Jul. 28, 2010 in Japanese Application No. 2006-283343.

* cited by examiner

*Primary Examiner* — Jack W Keith
*Assistant Examiner* — Marshall O'Connor
(74) *Attorney, Agent, or Firm* — Holtz Holtz Goodman & Chick, P.C.

(57) ABSTRACT

A fuel compact formed by integrally molding coated fuel particles by a press into a cylindrical body and comprising a chamfer having plane or curved surface at its corner to thereby prevent the coated fuel particles from being damaged due to stress on press molding whereby the strength thereof is improved against mechanical contact with a fuel sleeve and a graphite block.

9 Claims, 8 Drawing Sheets

Prior art

FUEL COMPACT

TECHNICAL FIELD OF THE INVENTION

This invention relates to an improvement on a fuel compact used as a nuclear fuel in a nuclear reactor such as a high-temperature gas cooled reactor and formed by dispersing in a graphite matrix, coated fuel particles formed by coating minute balls (fuel kernels) of an oxide or a carbide of nuclear fuel material such as uranium or thorium with a thermal decomposition carbon layer, a silicon carbide layer, etc. and integrally molding them and a method of manufacturing such a fuel compact.

BACKGROUND OF THE INVENTION

A high-temperature gas cooled reactor is a nuclear reactor which can take out a gas such as a helium gas with peculiar high safety and very high outlet temperature because a reactor core structure containing a nuclear fuel is formed from graphite having large calorific capacity and good high temperature soundness and also a gas such as a helium gas which never causes a chemical reaction under high temperature is used as a coolant gas. Thus, the high temperature heat of about 900° C. from the high-temperature gas cooled reactor can be used in broad fields such as a hydrogen manufacture and a chemical plant as well as an electric power generation.

(Coated Fuel Particles)

In general, coated fuel particles of about 500 micrometer to 1000 micrometer diameter are used as the nuclear fuel for this high-temperature gas cooled reactor. The coated fuel particles are formed by coating with total four layers of first to fourth layers, the fuel kernels of about 350 micrometer to 650 micrometer diameter obtained by sintering a uranium dioxide, a thorium, etc. to the form of ceramics. Specifically, the coated layers are the following four layers.

That is, the innermost first layer generally called a buffer layer is a layer which is formed of low-density thermal decomposition carbon (PyC) of a density of about 1 g/cm$^3$ and serves to store a gas of a gas-like fission product (FP) and also to absorb swelling of the nuclear fuel. In general, the second layer applied onto this first layer is an inner thermal decomposition carbon (PyC) layer formed of high-density thermal decomposition carbon of a density of about 1.8 g/cm$^3$ and serves to hold a gas-like fission product (FP) as a barrier of diffusion of the gas-like fission product (FP). The third layer called a silicon carbide (SiC) layer is formed of silicon carbide of a density of about 3.2 g/cm$^3$ and serves to hold a solid-like fission product as a barrier of diffusion of the solid-like fission product and also serves as a main reinforcing member for the whole coated fuel particles. The outermost thermal decomposition carbon layer as the fourth layer is formed of high-density thermal decomposition carbon of a density of about 1.8 g/cm$^3$ in the same manner as the second layer and serves to hold the strength of the whole coated fuel particles under irradiation by generating compression stress on the third silicon carbide layer by irradiation contraction and also to hold the gas-like fission product (FP).

Such coated fuel particles are generally manufactured through the following processes. First, concretely explaining the production of the fuel kernel, a dropping undiluted solution is produced by adding and agitating pure water and a thickening agent to a uranyl nitrate undiluted solution formed by melting uranium oxide powder in a nitric acid. In this case, the thickening agent is added so that the liquid drop of the dropped uranyl nitrate undiluted solution becomes true ball-like form by its own surface tension during its dropping. A resin such as a polyvinyl alcohol resin which has a property of being solidified under alkali conditions, polyethylene glycols and metolose for example may be used as this thickening agent. Subsequently, after cooling the dropping undiluted solution prepared in such a way to a predetermined temperature and adjusting its viscosity, it is dropped into the ammonia solution by vibrating a dropping nozzle of thin diameter. In this case, the deformation of the liquid drop is prevented when it lands on the ammonia solution surface by blowing an ammonia gas upon the liquid drop in space where it drops until it lands there so as to gel the surface of the liquid drop.

The undiluted solution dropped into the ammonia solution gets particles of heavy uranium acid ammonium by the full reaction of the uranyl nitrate with the ammonia in the ammonia solution. The particles of heavy uranium acid ammonium are roasted in the atmosphere to form uranium trioxide particles, which are further reduced and sintered to obtain the fuel kernels formed of high-density ceramics-like uranium dioxide. Since the diameter and the deviation from the spherical form of the thus obtained fuel kernels very substantially effect on the manufacture conditions in the subsequent coating process, the fuel kernels are fed to the coating process after their diameter is sorted by a sieve and their deviation from the spherical form is also sorted.

Thereafter, in the coating process of the fuel kernels, the fuel kernels are loaded in a fluid bed and sequentially coated with the first through fourth layers by thermally decomposing the coating gases. In this case, the first low-density carbon layer is applied onto the fuel kernels by thermally decomposing an acetylene ($C_2H_2$) at about 1400° C. The second and fourth high-density thermal decomposition carbon layers are applied by thermally decomposing a propylene ($C_3H_6$) at about 1400° C. The third silicon carbide layer is formed by thermally decomposing a methyl-chorolosilane ($CH_3SiCl_3$) at about 1600° C. The thus manufactured coated fuel particles get over-coated particles by further applying graphite matrix material comprising graphite powder, a caking agent, etc. on the surface of the coated fuel particles.

(Fuel Compact)

In using the thus over-coated coated fuel particle as a fuel compact, after dispersing the coated fuel particles in a graphite matrix material, they are molded by press or by die into a solid type or a hollow type cylindrical body and then sintered to produce the fuel compact 10 of predetermined form shown in FIG. 7(A) (see JP 2000-284084A, for example). This fuel compact 10 is formed by integrally binding a plural of coated fuel particles 12 by softening a phenol resin contained in the graphite matrix material by heating dies or punches when the coated fuel particles 12 are compressed as shown in FIG. 8.

(Loaded into a Reactor Core)

The thus formed fuel compact 10 has two kinds of solid type cylindrical body and hollow type cylindrical body and, in either case, 1) a predetermined amount of fuel compacts are contained in a fuel sleeve (cylinder) of graphite with its top and bottom closed by plugs so as to form a fuel rod and the fuel rods are loaded directly into a plural of insertion openings of a hexagon pillar type graphite block of the high-temperature gas cooled reactor, or 2) the fuel compacts are loaded directly into the insertion openings of the hexagon pillar type graphite block. Finally, the hexagon pillar type graphite blocks are loaded as the fuel into the reactor core while they are superposed one step on another step in a honey cam arrangement.

(Breakage of Fuel Compact)

Figure 7:
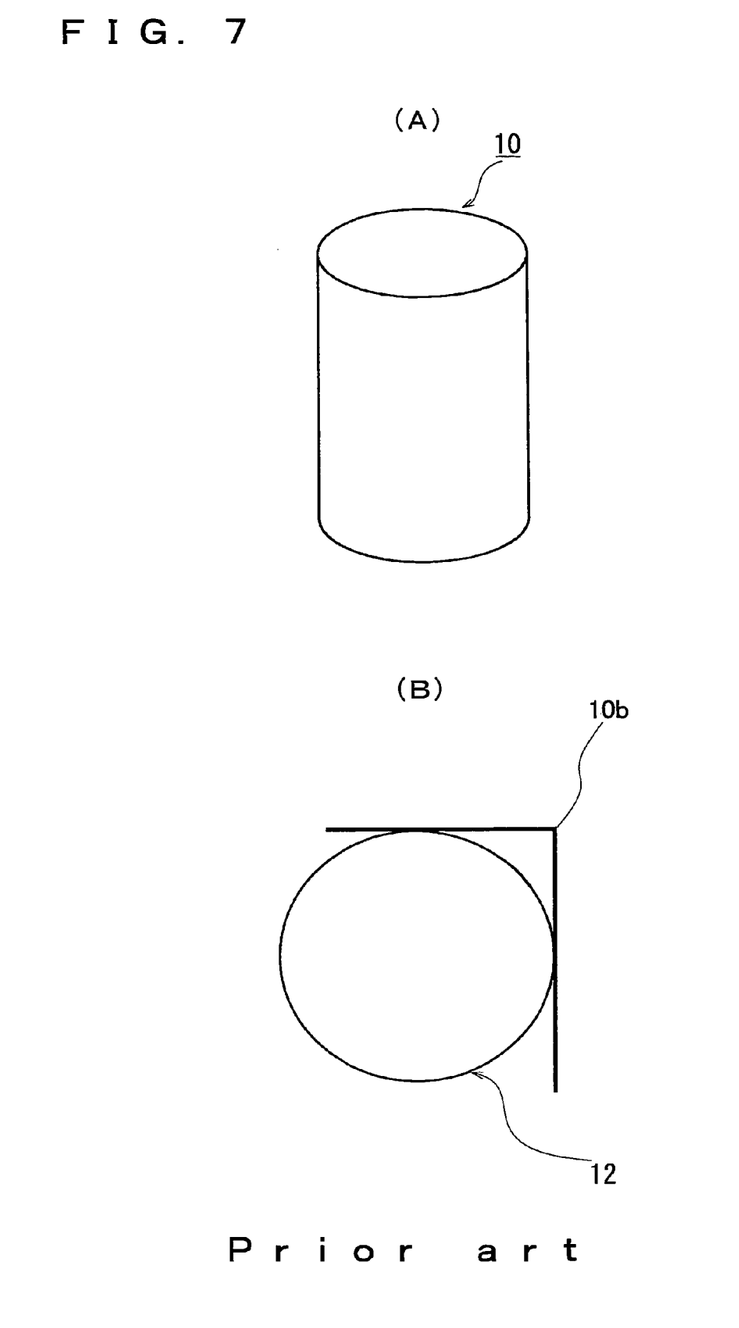
Figure 8:
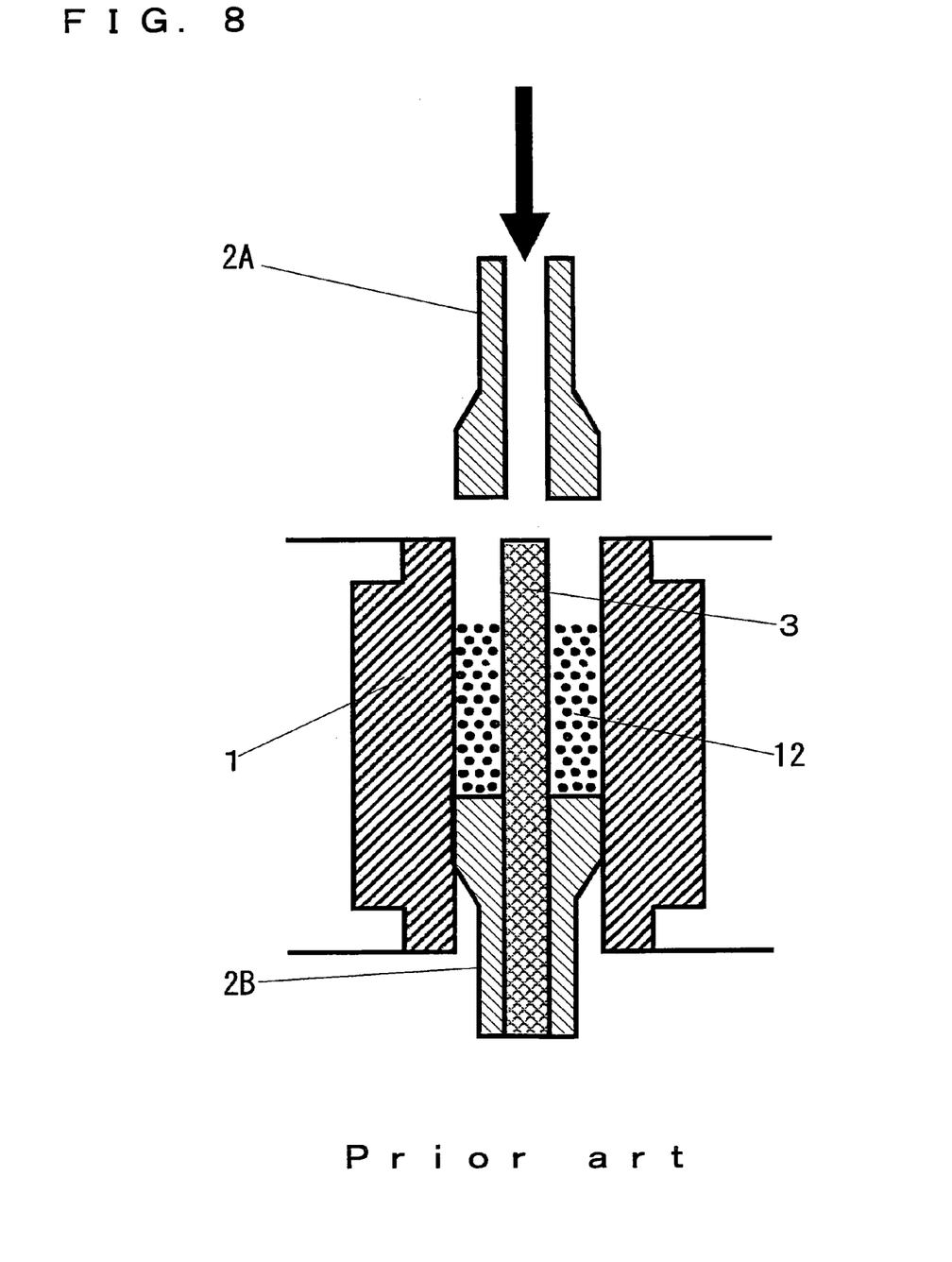
FIG. 8 is a brief cross sectional view of a state where the fuel compact of FIG. 7 is manufactured.

In this case, when the treatment of the fuel compacts 10, that is when they are loaded into the fuel sleeve or the graphite block is carried out, the fuel compact 10 mechanically contacts with the inner surface of the fuel sleeve or the graphite block to thereby apply an impact onto the fuel compact 10 whereby the corner 10b of the fuel compact 10 is possibly broken (see FIG. 7).

In this manner, as a breakage arises in the fuel compact 10, a state of high temperature occurs within the high-temperature gas cooled reactor and therefore, when the fuel compact 10 is thermally expanded, the broken pieces thereof are held between the fuel compact 10 and the inner face of the fuel sleeve or the graphite block, which causes a high stress to occur in the place where the broken pieces are held, whereby the fuel compact 10, the fuel sleeve and the graphite block are damaged.

In addition thereto, since a temperature difference arises due to a difference of cooling efficiency between the central part of the high-temperature cooling gas cooled reactor and the peripheral part thereof when the fuel compact is used in the reactor and therefore the central part of the high-temperature gas cooled reactor has a temperature higher than the peripheral part thereof, the central part of the high-temperature gas cooled reactor has thermal expansion larger than the peripheral part thereof, with the result that the fuel compact 10 tends to be deformed into a drum-like shape. The thus drum-shaped fuel compact 10 causes its corner 10b to mechanically contact with the inner surface of the fuel sleeve or the graphite block, which causes the fuel compact 10 to be possibly cracked.

Thus, it is required to prevent such breakage of the fuel compact 10, but, in this case, it is also required to take a consideration of not damaging the coated fuel particles 12 by the stress when it is pressed.

SUMMARY OF THE INVENTION

Accordingly, it is a principal object of the invention to provide a nuclear fuel compact adapted to prevent breakage of coated fuel particles and also to easily prevent breakage of the fuel compact, a fuel sleeve and a graphite block in an inexpensive manner.

It is another object of the invention to provide a method for being able to easily and inexpensively manufacture a nuclear fuel compact adapted to prevent breakage of coated fuel particles and also to prevent breakage of the fuel compact, a fuel sleeve and a graphite block.

In accordance with a first feature of the invention, there is provided a fuel compact formed by integrally molding coated fuel particles characterized by comprising a chamfer formed in its corner and said chamfer having plane or curved surface.

In the fuel compact according to the first feature of the invention, the fuel compact may have the cylindrical form and the chamfer may be formed in the corner of the cylindrical fuel compact. Furthermore, the chamfer may be formed in each of the corners of the upper and lower ends of the cylindrical fuel compact.

Moreover, in the fuel compact according to the first feature of the invention, in the case where the chamfer is in plane form, it may be of two or more stepped planes having different angles relative to an axial direction of the cylindrical fuel compact.

Furthermore, in the case where the chamfer is in plane form, it is desirable that a thickness of the chamfer may be 0.10 mm or more, that the chamfering angle of the chamfer may fall within a range of 30° to 60° and that the upper limit of the thickness of the chamfer may have a value corresponding to the thickness in the state where the surface of the chamfer contacts with the periphery of the coated fuel particles.

In addition thereto, in the case where the chamfering angle of the chamfers is other than 45°, the upper limit of the thickness of the chamfer preferably corresponds to a value corresponding to a larger value among two specified thicknesses of the chamfer in the state where the surface of the chamfer contacts with the periphery of the coated fuel particles.

In the fuel compact according to the first feature of the invention, in the case where the chamfer is of curved shape, the upper limit of the thickness of the curved chamfer is set at the value where the curved chamfer contacts the outer peripheral face of the coated fuel particles.

In accordance with the second feature of the invention, there is provided a method of manufacturing a fuel compact by integrally molding coated fuel particles by a die, characterized by forming a plane or curved taper in the corner of the die to thereby form plane or curved chamfer in the corner of the fuel compact. The plane taper may be of a single or multi-stepped plane form.

In the method of manufacturing the fuel compact according to the second feature of the invention, the taper may be formed in the corner of the die by attaching a ring-like taper member having the taper surface onto the die.

According to the first feature of the invention, since the chamfer is formed in the corner of the cylindrical fuel compact, the stress applied to the fuel compact decreases even though the fuel compact mechanically contacts with the surface of the fuel sleeve or the graphite block when it is handled or when it is thermally expanded and therefore the breakage of the fuel compact or the cracks in the fuel compact can be prevented, which causes the breakage of the fuel sleeve or the graphite block to be prevented.

Especially, as the chamfer is of two stepped plane shape or curved shape, the thickness and the surface area of the chamfer can be larger and therefore the breakage of the fuel compact and the cracks in the fuel compact can be more effectively prevented in a preferable manner.

As the thickness and the chamfering angle of the plane shaped chamfer may be adjusted appropriately or as the upper limit of the thickness of the curved chamfer is set at the value where the curved chamfer contacts the outer peripheral face of the coated fuel particles, the chamfer may have the shape corresponding to the shape of the coated fuel particles. This prevents stress from being unnaturally applied to the coated fuel particles when they are pressed even though the chamfer is formed and therefore the coated fuel particles are never broken. Thus, the strength of the fuel compact against the mechanical impact can be improved while the breakage of the coated fuel particles is prevented.

According to the second feature of the invention, since the taper of plane form or curved form is formed at the corner of the mold to thereby form the chamfers at the corner of the cylindrical fuel compact, the breakage of the fuel compact which can be effectively prevented can be more easily manufactured.

In this case, as the taper in the corner of the die may be formed by the ring-like taper member having the taper surface, the existing equipment can be utilized only by mounting the taper member onto the inside of the die without adding any large change, which allows the easier production of the fuel compact which is able to effectively prevent its breakage.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 1 illustrates a fuel compact according to a first form of an embodiment of the invention wherein FIG. 1(A) is a perspective view of the fuel compact; FIG. 1(B) is an enlarged and vertically cross-sectional view of one corner of the fuel compact; FIG. 1(B) also shows additional coated fuel particles adjacent to the coated fuel particle located at the upper corner of the fuel compact; FIG. 1(C) is an enlarged and vertically cross-sectional view of a fuel particle located at the upper corner of the fuel compact which has a chamfer provided in a form different from that of FIG. 1(B); and FIG. 1(D) is a sectional view taken along line D-D of FIG. 1(A);

FIG. 3 illustrates a fuel compact according to a modification of the first form of embodiment of the invention wherein FIG. 3(A) is a enlarged cross sectional view of a part of the fuel compact according to the first modification and FIG. 3(B) is an enlarged cross sectional view of a part of the fuel compact according to the second modification;

FIG. 4 illustrates a part of a fuel compact according to a further modification of the first form of embodiment of the invention wherein FIG. 4(A) is a enlarged cross sectional view of a part of the fuel compact according to the first further modification and FIG. 4(B) is an enlarged cross sectional view of a part of the fuel compact according to the second further modification;

FIG. 5 illustrates a fuel compact according to a second form of embodiment of the invention wherein FIG. 5(A) is a perspective view of the fuel compact, FIG. 5(B) is an enlarged cross sectional view of a part thereof and FIG. 5(C) is an enlarged cross sectional view of the same part as FIG. 5(B), but having the chamfer provided in the form different from that of FIG. 5(B);

FIG. 7 illustrates a fuel compact according to a prior art wherein FIG. 7(A) is a perspective view of the fuel compact and FIG. 7(B) is an enlarged cross sectional view of a part thereof.

DETAILED DESCRIPTION OF PREFERRED EMBODIMENTS

Figure 1:
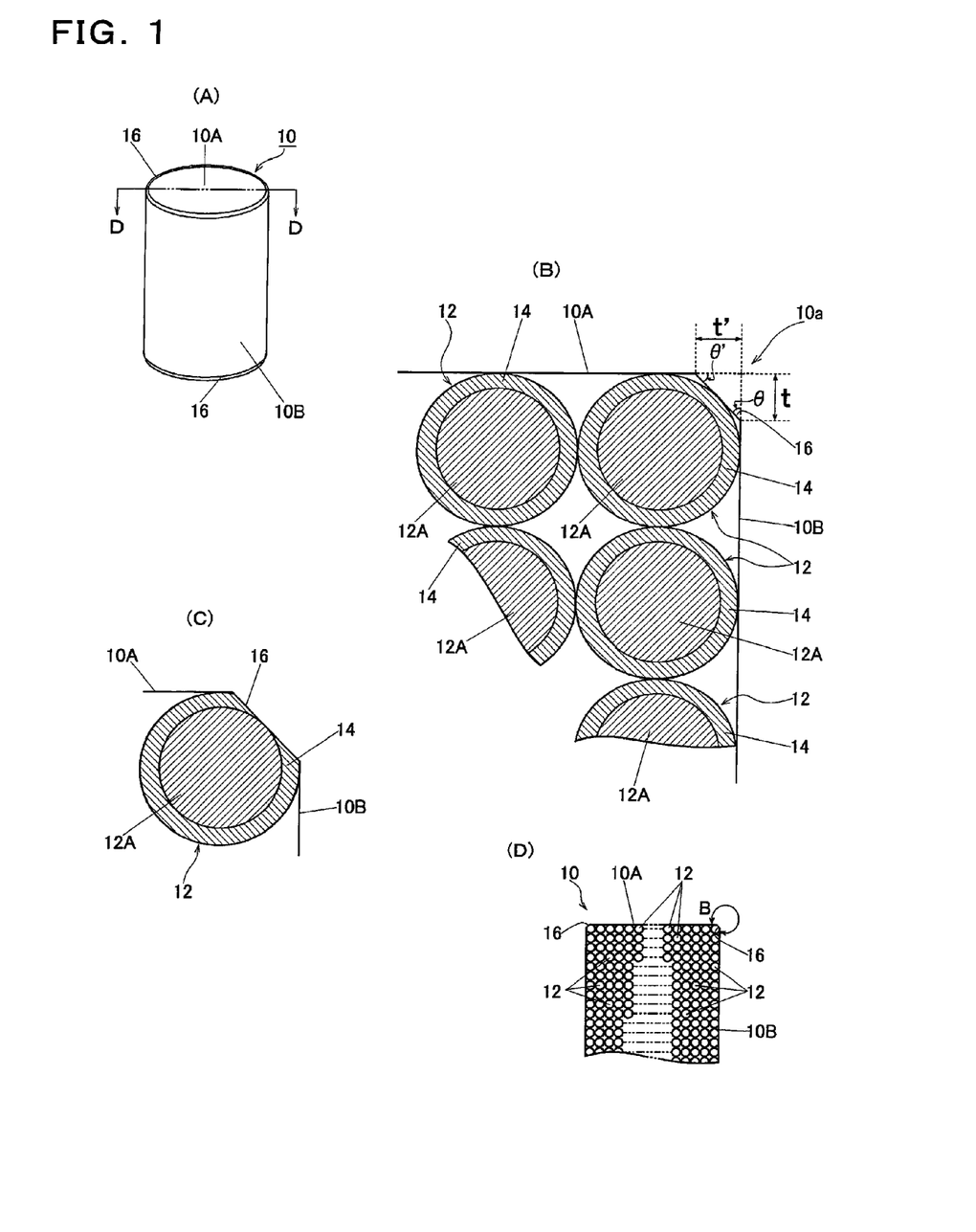
Figure 2:
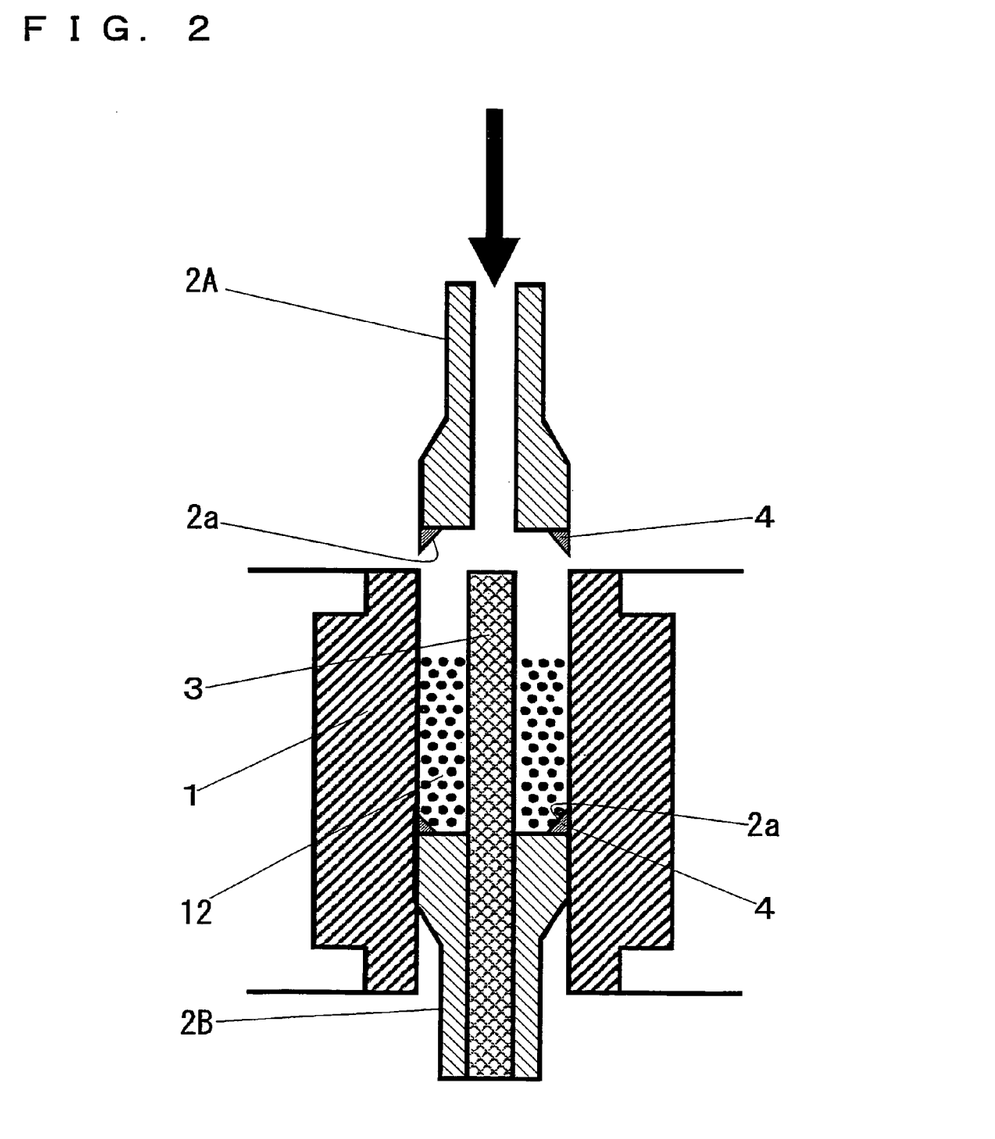
FIG. 2 is a brief cross sectional view of a state of carrying out a method of manufacturing the fuel compact according to the first form of embodiment of the invention.

Describing some forms where the invention is embodied with reference to accompanying drawings, FIG. 1 illustrates a nuclear fuel compact according to a first mode of embodiment of the invention and this fuel compact is formed by integrally molding a plural of over-coated particles 12 shown in FIG. 1(B) in an enlarged manner while thermally compressing them with a die shown in FIG. 2 either by press or by molding.

Concretely explaining this, the fuel compact 10 may be manufactured by dispersing a predetermined amount of the coated fuel particles 12 into a graphite matrix comprising a graphite powder, a caking agent, etc., as to produce the over-coated particles 12, loading them in a metal die 1, as shown in FIG. 2 and then by compressing them by upper and lower metal punches 2A and 2B within the die 1.

When the fuel compact 10 should be produced, the over-coated particles 12 may be heated by heating the die 1 and the punches 2 so that the phenol resin contained in the graphite matrix material within the over-coat layer 14 is softened whereby the graphite powder serves as a binder between the coated fuel particles 12, which causes the cylindrical fuel compact 10 shown in FIG. 1 to be formed. In FIG. 2, a reference numeral 3 designates a core rod for forming a hollow part of the cylindrical fuel compact 10, which may be provided if required. The die 1, the punches 2 and the core rod 3 may be formed of alloy tool steels, for example.

The over-coated particles 12, before compressed, is provided with an overcoat layer 14 which is formed by coating the graphite matrix material of the graphite powder, the caking agent, etc. on the surface of the coated fuel particles 12 as shown in FIG. 1(B), which is already described. The overcoat layer 14 is formed, 1) in order to prevent the damage of the coated fuel particles 12A due to the pressure applied on press molding and 2) in order to prevent the thermal and mechanical damage of the coated fuel particles 12A on sintering by uniformly dispersing the coated fuel particles in the fuel compact 10 while the overcoat layer 14 is arranged between the adjacent coated fuel particles 12A. To this end, in general, the fuel compact 10 is formed by uniformly arranging the diameter of the over-coated particles 12A so that the coated fuel particles 12A may be uniformly dispersed.

Although the overcoat layer 14 may be formed by dispersing the coated fuel particles 12A in the graphite matrix material comprising the graphite powder, the caking agent, etc., the thickness of the overcoat layer 14 can be adjusted to the proper value by setting the proper mesh size of a screen for sifting therethrough the coated fuel particles 12A having the overcoat layer 14 formed in the middle and last steps of the overcoat process and adjusting the time for the overcoat process.

The fuel compact 10 of the invention has a plane chamfer 16 formed in the corner 10a of the cylindrical fuel compact 10, as shown in FIG. 1. As shown in FIG. 1(A), the chamfer 16 may be desirably formed over all the circumference of each of the upper and lower corners 10a of the cylindrical fuel compact 10.

The chamfer 16 serves to reduce the stress applied to the fuel compact 10 because the mechanical impact applied to the corners 10a of the fuel compact 10 is distributed in comparison with the case where the load is locally applied to the edges 10b of the prior art fuel compact 10 shown in FIG. 7. Thus, the damage of the fuel compact 10 can be prevented and therefore the damage of the fuel sleeve and the graphite block, both of which are not shown, due to the removed pieces of the fuel compact 10 can be prevented.

The chamfer 16 is fundamentally formed by mechanically cutting the upper and lower corners of the fuel compact 10 molded as shown in FIG. 7. In this case, the cutting process should be performed so that the coat layer of the coated fuel particles 12A is not damaged and therefore the range of thickness of the chamfer 16 is considerably important therefor. Instead of this mechanical working, the chamfer 16 may be formed by compression-processing the over-coated particles 12A by tapers 2a formed on the corners of the metal die such as the upper and lower punches 2A and 2B as shown in FIG. 2. The tapers 2a may be formed by attaching ring-like plane taper members 4 onto the upper and lower punches 2A and 2B, as shown in FIG. 2.

As the fuel compact 10 is manufactured according to the method as shown in FIG. 2, the method of manufacturing the fuel compact according to the invention can be carried out just by attaching the taper members 4 onto the conventionally used punches 2A and 2B as shown in FIG. 8 without any large change applied to the punches 2A and 2B. In this manner, since the existing manufacturing equipment can be effectively used, the fuel compact 10 of the invention having the chamfers 16 can be manufactured easily and inexpensively. The taper members 4 may be attached onto the corners of the upper and lower punches 2A and 2B by setting the diameter of the taper members 4 to a value equal to the diameter of the upper and lower punches 2A and 2B.

The thicknesses t and t' (refer to FIG. 1 (B)) of the chamfer 16 may be desirably at least 0.10 mm or more. The damage of the fuel compact 10 can be fully prevented because the area of chamfer face of the chamfer 16 may get larger as the thicknesses t and t' of the chamfer 16 get larger whereby the mechanical shock applied to the fuel compact 10 can be distributed so as to fully reduces the stress. In this invention, what is meant by the thickness t and t' of the chamfer 16 is a distance from a position where one end face (the upper (or lower) face 10A or the side face 10B) of the fuel compact 10 is located to a position where the chamfer 16 intersects the other end face (the side face 10B or the upper (or lower) face 10A) in the chamfers 16 formed over the upper (or lower) face 10A and the side face 10B in the fuel compact 10 formed over the upper (or lower) face 10A and the side face 10B intersecting each other perpendicularly as shown in FIG. 1(B).

In this manner, the thicknesses t and t' of the chamfer 16 may be desirably set up to a value as large as possible in order to prevent the damage of the fuel compact 10. However, if the thicknesses t and t' of the chamfer 16 would be set up to an excessively larger value, in case where the chamfer 16 is formed by mechanical working, the coat layer of the coated fuel particles 12A might be cut so as to adversely affect the irradiation action of the fuel compact and in case where the chamfer 16 is formed by the method of FIG. 2, the strength of the coated fuel particles 12A is adversely affected. Thus, the thickness should be preferably set within the range of value in which the fuel compact is not subject to such adverse affects. Also, if the chamfering angles $\theta$ and $\theta'$ (see FIG. 1(B): the inclination angle of the chamfer 16 relative to the end face of the fuel compact 10: $\theta+\theta'=90°$) is set to more than the required value (if the other chamfering angle is set up to a smaller value), then the stress reduction function of the chamfers 16 will be reduced.

To this end, the chamfering angles $\theta$ and $\theta'$ (see FIG. 1(B) of the chamfer 16 may be set at a value which falls within a range of 30° to 60° and the upper limit of the thicknesses t and t' of the chamfer 16 may desirably have a value corresponding to the thickness of the chamfer 16 when the chamfer 16 is deeply formed until the surface of the chamfer contacts with the peripheral face of the coated fuel particles 12 (see FIG. 1(C)).

In the above-mentioned concrete example, if the thicknesses t and t' of the chamfer 16 exceed the aforementioned upper limit, then chamfer 16 is formed so that a part of the coat layer of the coated fuel particles 12A is cut and therefore, the load will be excessively applied to the coated fuel particles 12A on compression of the over-coated coated fuel particles 12A, which causes the coated fuel particles 12A to be damaged and causes a undesirable state when the fission products are held. Especially, in the case where the chamfer 16 is formed by mechanical cutting while the thickness thereof exceed the upper limit, the coat layer of the coated fuel particles will be undesirably cut whereby there arises an inconvenience for the function of holding the fission products. Thus, it is required that the upper limit of the thicknesses t and t' of the chamfer 16 should correspond at least to the thickness in the case where the surface of the chamfer is set at the position where it is superposed on the peripheral face of the coated fuel particles 12A and it is required that it is set up to the value not more than the above-mentioned thickness. This can improve the strength against the mechanical shock of the manufactured fuel compact 10 together with the prevention of the breakage of the coated fuel particles 12A having the overcoat layer 14.

As shown in the illustrated form of embodiment, as the chamfering angle of the chamfer 16 is set up to 45°, both of the chamfering angles $\theta$ and $\theta'$ get 45° and the thickness t from the upper face (or lower face) 10A of the fuel compact 10 gets equal to the thickness t' from the side face 10B. On the other hand, as shown in FIGS. 3(A) and 3(B), if the chamfering angle of the chamfer 16 is set up to the value other than 45°, there will exist the chamfering angles $\theta$ and $\theta'$ of different value (30° and 60°, for example) and as a result, the thicknesses of the chamfer 16 will be specified at the different value.

More particularly, in the form of embodiment shown in FIG. 3(A), the thickness X1 from the upper surface 10A is different from the thickness X2 from the side face 10B and also in the form of embodiment shown in FIG. 3(B), the thickness Y1 from the upper surface 10A is different from the thickness Y2 from the side face 10B. In these case, among the thicknesses X1 or X2 (Y1 or Y2) of the chamfer 16 when the chamfer face contacts with the peripheral face of the coated fuel particles 12A, the larger value thereof is set at the upper limit and the thickness is set not to exceed beyond the upper limit.

Furthermore particularly, the value of the thickness X1, which is a distance from the upper (lower) face 10A in the form of embodiment shown in FIG. 3(A) and the value of the thickness Y2, which is a distance from the side face 10B in the form of embodiment shown in FIG. 3(B) are set as the upper limit of the thicknesses of the chamfer 16, respectively so as not to exceed beyond the upper limit whereby the other thicknesses (X2 and Y1) necessarily get smaller than the thicknesses (X1 and Y2), respectively. Thus, the chamfer 16 never adversely affect the coated fuel particles 12A having the overcoat layer 14 whereby the damage of the coated fuel particles 12A having the overcoat layer 14 can be prevented.

Figure 4:
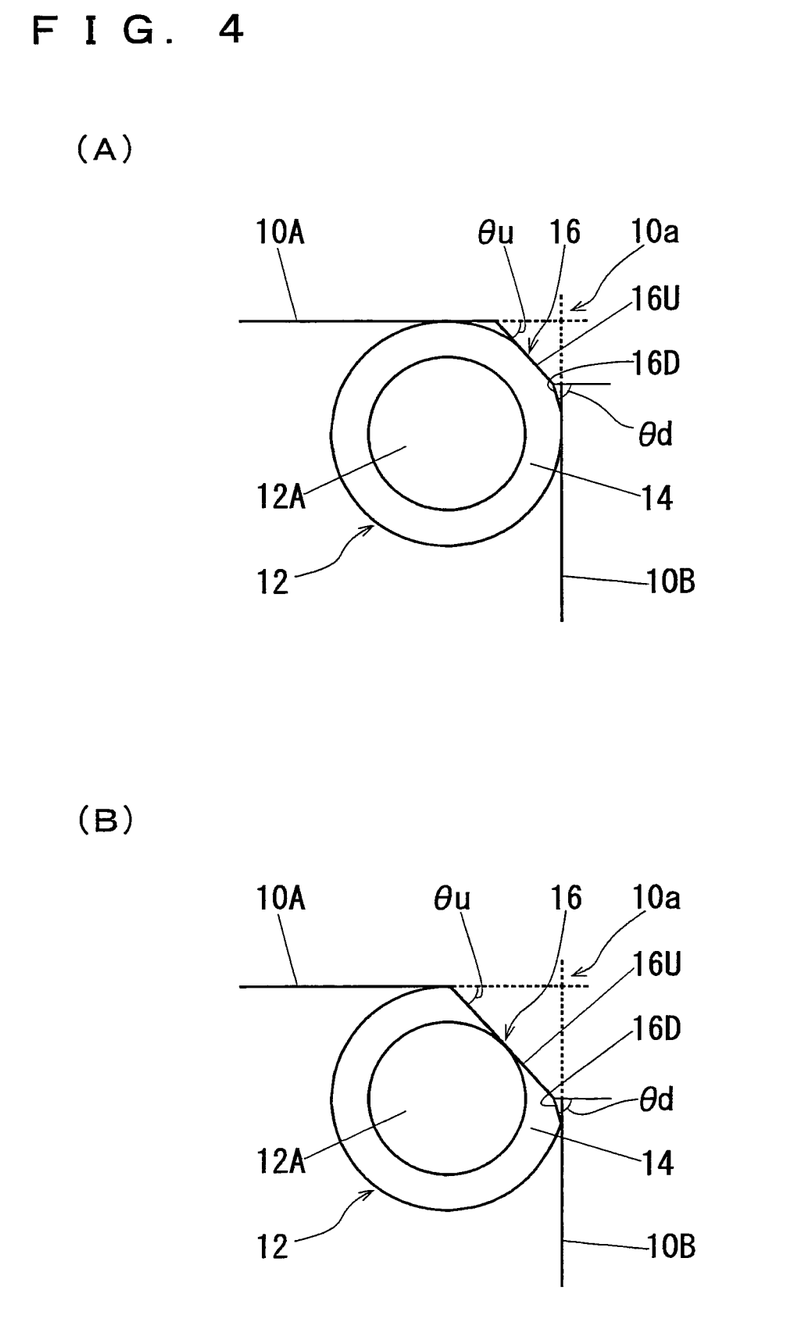

A modification of the first form of embodiment of the invention is illustrated in FIGS. 4(A) and 4(B) and in this modification, the chamfer 16 has two stepped plane form of different chamfering angles in the direction of an axis of the cylindrical fuel compact 10. In the illustrated embodiment, the chamfering angle $\theta u$ of the first step (upper) plane chamfer portion 16U is set at a value smaller than the chamfering angle $\theta d$ of the second step (lower) chamfer portion 16D. In this modification, the overcoat layer 14 may be cut as shown in FIG. 4(B) so that the chamfer 16 contacts with the coat layer of the coated fuel particles 12A in the same manner as in FIG. 1(C).

Figure 3:
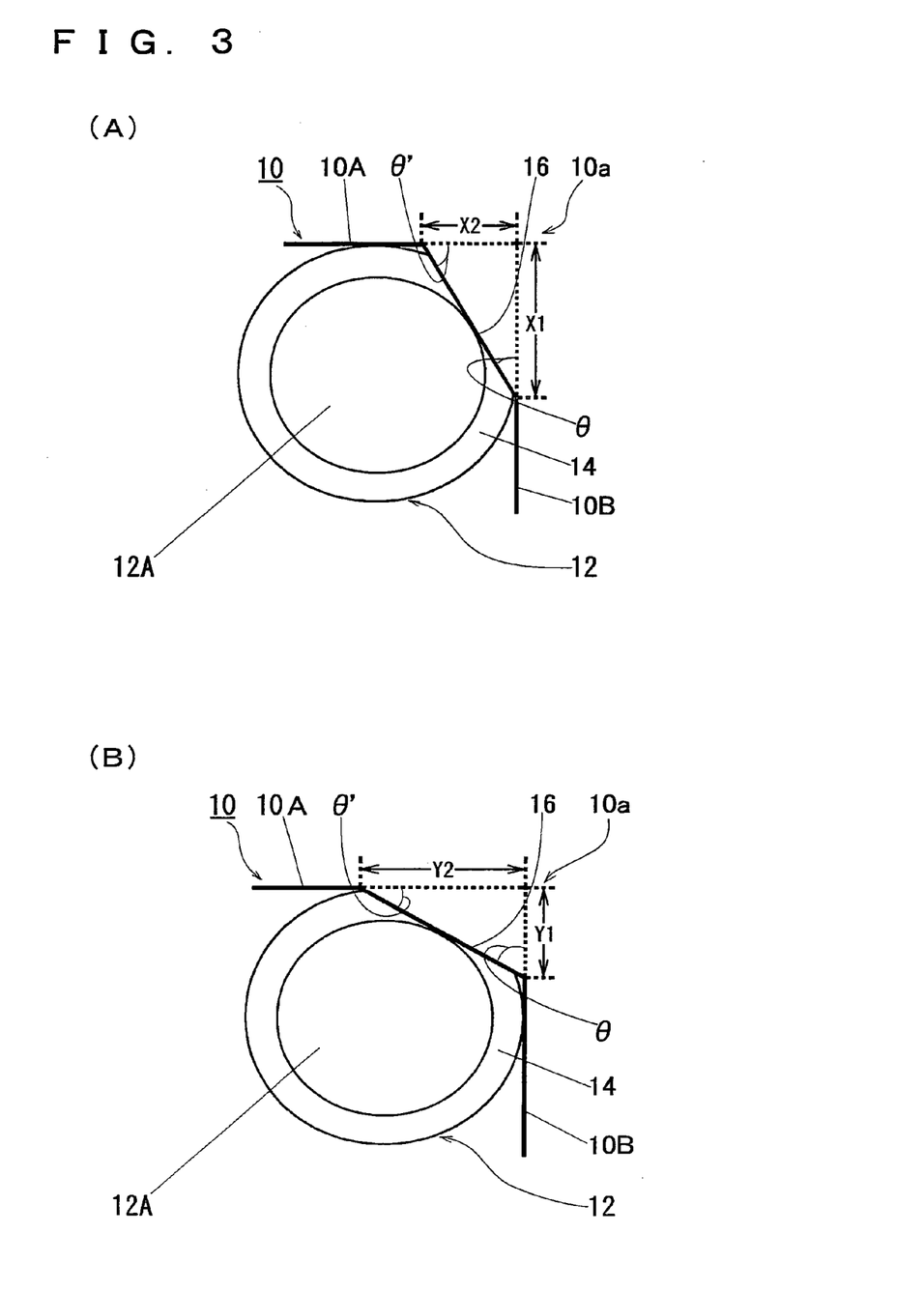

According to this modification, since the thicknesses and the surface areas of the chamfer can be made larger than those of the single plane chamfers 16 shown in FIGS. 1 and 3, the damage and the crack of the fuel compact can be more effectively prevented in a desirable manner.

Figure 5:
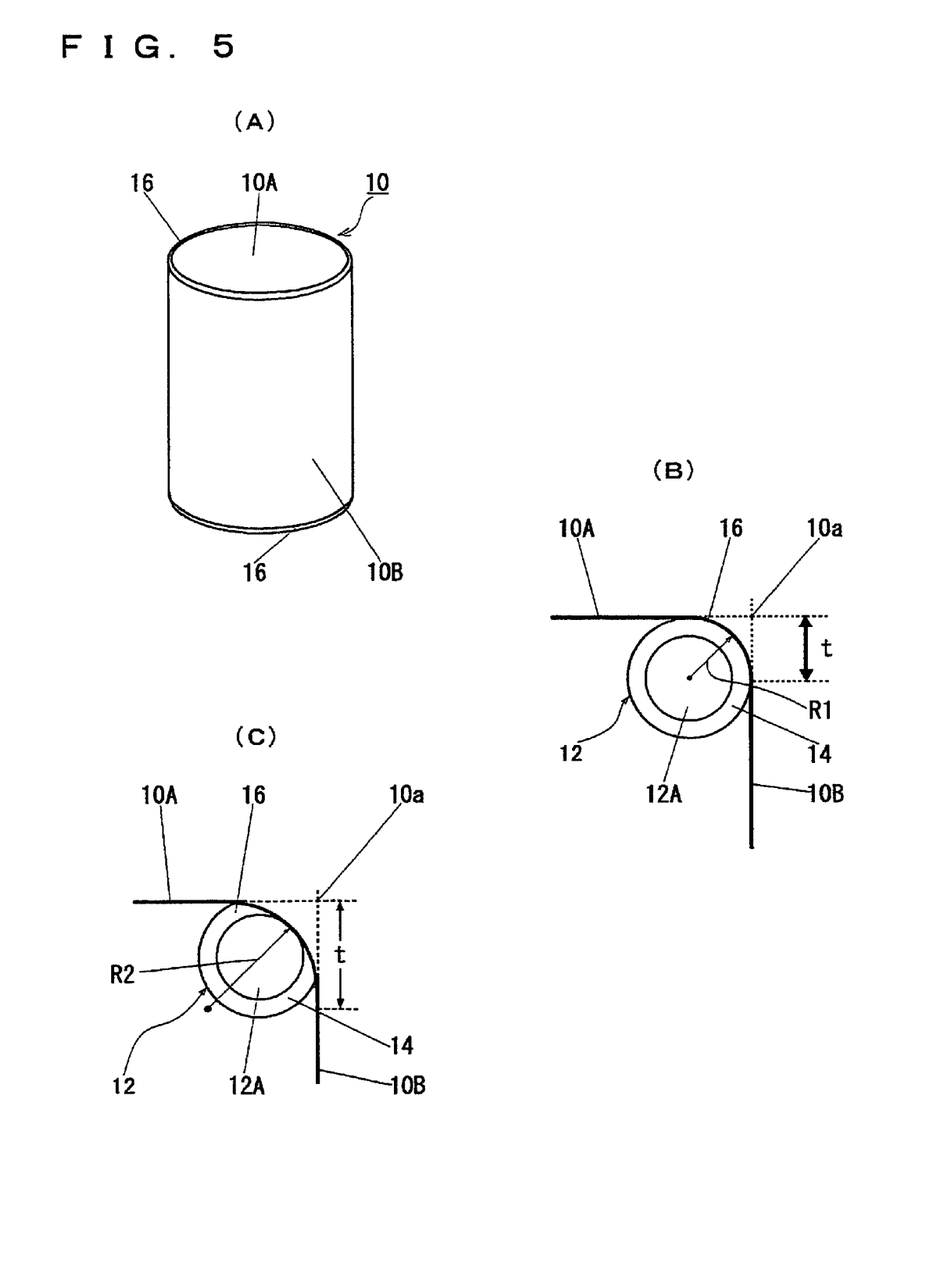

The fuel compact 10 according to the second form of embodiment of the invention is illustrated in FIG. 5 and in this form of embodiment, the chamfer 16 has a curved form as shown in FIG. 5(B). In this manner, with the chamfer 16 having the curved form, the thickness t and the surface area of the chamfers 16 (see FIG. 5(B)) can be set at a value larger than those of the plane chamfer 16.

In the example of FIG. 5(B), the curved chamfer 16 has a radius of the curved face R1 set so as to contact the outer face of the overcoat layer 14 on the coated fuel particles 12A (in this case, the radius of the curved face is equal to the radius of the overcoat layer 14). The curved chamfer 16 may have the larger radius and thickness of the curved face set by forming the chamfer 16 in the state where the overcoat layer 14 is cut as shown in FIG. 5(C), but in order to prevent the coat layer of the coated fuel particles 12A from being cut or damaged, the upper limit of the thickness of the curved face should be set at the value where the curved face of the chamfer 16 contacts the peripheral face of the coated fuel particles 12*a* (the peripheral face of the coat layer) as shown in FIG. 5(C). In this case, the radius of the curved face is indicated by R2 in FIG. 5(C).

Thus, as the chamfers 16 have the thickness t of the curved face getting larger, the surface area of the chamfer 16 can be enlarged and therefore, since the stress applied to the fuel compact 10 decreases even though the fuel compact 10 mechanically contacts with the inner surface of the not shown fuel sleeve or graphite block when it is handled or when it is thermally expanded and therefore the breakage of the fuel compact 10 or the crack in the fuel compact 10 can be prevented, which causes the breakage of the fuel sleeve or the graphite block to be sufficiently prevented.

Since the chamfer 16 has the curved form following the configuration of the coated fuel particles 12 even though the thickness of the curved face gets large to the upper limit, the stress is unnaturally never applied to the coated fuel particles 12A due to the chamfer 16 on pressing and therefore the coated fuel particles 12A are never broken, which improves the strength against the mechanical shock of the fuel compact 10 while the breakage of the coated fuel particles 12A is prevented.

Furthermore, in case where the thickness of the curved face of the chamfer 16 does not reach the upper limit, the graphite matrix material will be interposed between the chamfer face and the coated fuel particles 12A, which causes a unnatural pressure to be applied to the coated fuel particles 12A due to the compression of the graphite matrix material on pressing to thereby possibly break the coated fuel particles 12A.

In this manner, as the upper limit of the thickness of the curved surface of the chamfer 16 is so set that the coat layer of the coated fuel particles 12A is neither cut nor damaged, the thickness t of the chamfers 16 can be set up to the thickness of the value sufficiently as large as close to the radius of the coated fuel particles 12A while the stress applied to the coated fuel particles 12A is fully reduced so as to prevent the breakage of the coated fuel particles 12A whereby the mechanical strength of the fuel compact can be improved and the breakage of the fuel compact, the fuel sleeve and the graphite block can be sufficiently prevented.

Figure 6:
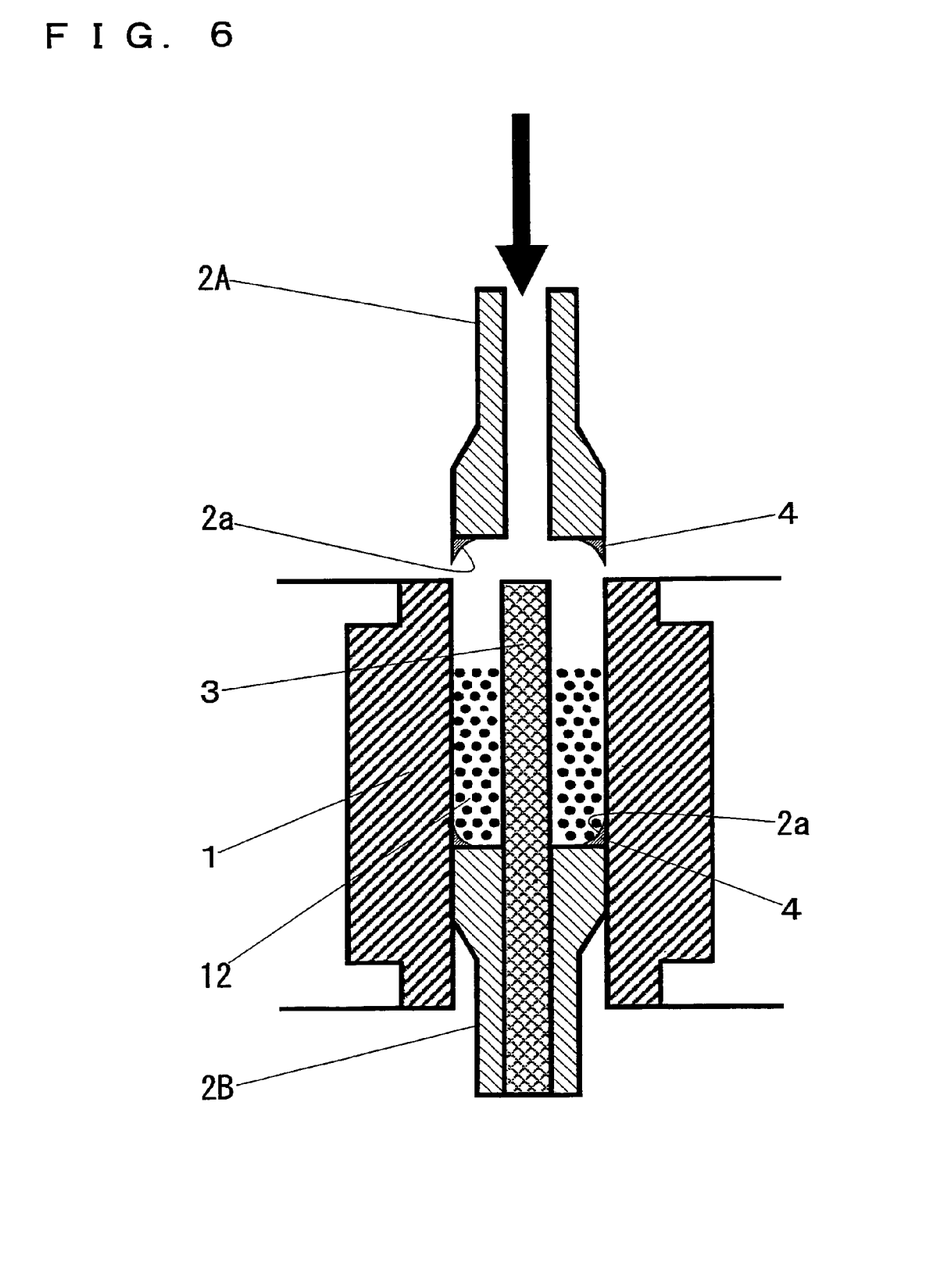
FIG. 6 is a brief cross sectional view of a state where a method of manufacturing the fuel compact of FIG. 5 is carried out.

In the same manner as in the form of embodiment of FIG. 1, the chamfer 16 of the curved form can be also formed by mechanical working, but instead of it, it may be formed by providing curved face portions 2*a* on the corners of the die such as the upper and lower punches 2A and 2B, etc. and by compressing the coated fuel particles 12A having the overcoat layer 14 (that is the over-coated particles 12). In this case, in order to be able to effectively use the existing production equipment, this curved face portions 2*a* can be formed by attaching the taper-ring like taper members 4 having curved surface form onto the upper and lower punches 2A and 2B as shown in FIG. 6.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A cylindrical nuclear fuel compact having an upper end, a lower end and a peripheral surface comprising an integral mold of a plurality of coated fuel particles which have an overcoat layer provided thereon, wherein a chamfer is formed in a corner of both of the upper end and the lower end of said nuclear fuel compact, said chamfer having a straight or curved vertical cross-section and said chamfer is formed by cutting or compression so as to intersect the overcoat layer, but so as not to damage said coated fuel particles.

2. A fuel compact as set forth in claim 1, wherein said chamfer has two or more stepped planes of different chamfering angles.

3. A fuel compact as set forth in claim 1, wherein said chamfer has said straight vertical cross-section and wherein a distance t or t' is 0.10 mm or more, said distance t is a height distance between a top point and a bottom point of an inclination of said straight vertical cross-section of said chamfer, and said distance is a horizontal distance between said top point and said bottom point of said inclination of said straight vertical cross-section of said chamfer.

4. A fuel compact as set forth in claim 3, wherein said chamfer has a chamfering angle in a range of 30° to 60°.

5. A fuel compact as set forth in claim 1, wherein said chamfer has a straight cross-section, and said chamfer has a chamfering angle in a range of 30° to 60°.

6. A fuel compact as set forth in claim 3, wherein said chamfer has a chamfering angle other than 45°, and the distance t is not equal to the distance t'.

7. A method of manufacturing a fuel compact as set forth in claim 1 comprising integrally molding coated fuel particles by a die and forming a plane or curved taper on a corner of said die to thereby form a chamfer having a straight or curved cross-section.

8. A method of manufacturing a fuel compact as set forth in claim 7, wherein said taper is formed on said corner of said die by attaching a ring-like taper member having a taper surface on said die.

9. A fuel compact as set forth in claim 5, wherein said chamfering angle of said chamfer is other than 45°, and a distance t is not equal to a distance t', said distance t is a height distance between a top point and a bottom point of an inclination of said straight vertical cross-section of said chamfer, and said distance t' is a horizontal distance between said top point and said bottom point of said inclination of said straight vertical cross-section of said chamfer.

* * * * *